United States Patent
Li et al.

(10) Patent No.: US 12,206,296 B2
(45) Date of Patent: Jan. 21, 2025

(54) MOTOR CONTROLLER AND OUTER ROTOR MOTOR COMPRISING THE SAME

(71) Applicant: Zhongshan Broad-Ocean Motor Co., Ltd., Zhongshan (CN)

(72) Inventors: Jianhui Li, Zhongshan (CN); Gui Zhang, Zhongshan (CN); Hairong Sun, Zhongshan (CN); Chao Guan, Zhongshan (CN); Xiaosan Xu, Zhongshan (CN); Yunsheng Chen, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 225 days.

(21) Appl. No.: 17/899,593

(22) Filed: Aug. 30, 2022

(65) Prior Publication Data

US 2022/0416629 A1    Dec. 29, 2022

Related U.S. Application Data

(63) Continuation-in-part of application No. PCT/CN2021/115619, filed on Aug. 31, 2021.

(30) Foreign Application Priority Data

Jun. 22, 2021  (CN) .......................... 202121381434.2

(51) Int. Cl.
*H02K 11/33* (2016.01)
*H02K 5/04* (2006.01)
(Continued)

(52) U.S. Cl.
CPC .............. *H02K 11/33* (2016.01); *H02K 5/04* (2013.01); *H02K 7/08* (2013.01); *H02K 9/22* (2013.01)

(58) Field of Classification Search
CPC . H02K 11/33; H02K 5/04; H02K 7/08; H02K 9/22
(Continued)

(56) References Cited

FOREIGN PATENT DOCUMENTS

| CN | 205901554 U | 1/2017 |
| CN | 110224640 A | 9/2019 |
| CN | 213402646 U | 6/2021 |

OTHER PUBLICATIONS

Machine_translation_of_CN110224640_Zeng, Sep. 10, 2019.*

* cited by examiner

*Primary Examiner* — Terrance L Kenerly
(74) *Attorney, Agent, or Firm* — MATTHIAS SCHOLL P.C.; Matthias Scholl

(57) ABSTRACT

A motor controller includes a housing, a power circuit board, and a control circuit board. The housing includes a first mounting platform, a second mounting platform, and a side wall. There is a height difference between the first mounting platform and the second mounting platform. The first mounting platform is disposed on an upper part of the side wall, and the second mounting platform is disposed on a middle part of the side wall. The second mounting platform is disposed on one side of the first mounting platform. The first mounting platform and the side wall form an upper chamber, and the control circuit board and the power circuit board are disposed in the upper chamber. The control circuit board is closer to the first mounting platform than the power circuit board. The second mounting platform and the side wall form a lower chamber communicating with the upper chamber.

9 Claims, 21 Drawing Sheets

(51) Int. Cl.
*H02K 7/08* (2006.01)
*H02K 9/22* (2006.01)
(58) Field of Classification Search
USPC .......................................................... 310/52
See application file for complete search history.

MOTOR CONTROLLER AND OUTER ROTOR MOTOR COMPRISING THE SAME

CROSS-REFERENCE TO RELATED APPLICATIONS

This application is a continuation-in-part of International Patent Application No. PCT/CN2021/115619 with an international filing date of Aug. 31, 2021, designating the United States, and further claims foreign priority benefits to Chinese Patent Application No. 202121381434.2 filed Jun. 22, 2021. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a motor controller and an outer rotor motor comprising the same.

Conventionally motors include a motor body and a motor controller disposed on the bottom of the motor body. The motor controller includes a control box and a control board disposed in the control box. The control board is equipped with a power module with high heat and a rectifier bridge module. Because the diameter of the motor is related to the motor power, the size of the motor with different power is also different, so that the control board in the motor controller also need different sizes to match the motor, which causes the inconvenience of use.

SUMMARY

The disclosure provides a motor controller, comprising a housing, a power circuit board, and a control circuit board. The housing comprises a first mounting platform, a second mounting platform, and a side wall; there is a height difference between the first mounting platform and the second mounting platform; the first mounting platform is disposed on an upper part of the side wall, and the second mounting platform is disposed on a middle part of the side wall; the second mounting platform is disposed on one side of the first mounting platform; the first mounting platform and the side wall form an upper chamber, and the control circuit board and the power circuit board are disposed in the upper chamber; the control circuit board is closer to the first mounting platform than the power circuit board; the second mounting platform and the side wall form a lower chamber; the lower chamber communicates with the upper chamber; and a rectifier bridge module protrudes from the power circuit board, and is attached to the second mounting platform for heat dissipation.

In a class of this embodiment, the second mounting platform comprises a recess; the rectifier bridge module is embedded in the recess for heat dissipation, and is locked on the second mounting platform through a locking device.

In a class of this embodiment, the locking device comprises a depression bar and at least two bolts; two ends of the recess are concave to form two gaps, respectively; a bottom surface of the recess in the two gaps comprises two mounting holes; two ends of the depression bar are disposed in the two gaps, respectively, whereby the depression bar presses on the rectifier bridge module; and the at least two bolts pass through the depression bar and fixedly screwed in the two mounting holes on the bottom surface of the recess.

In a class of this embodiment, a plurality of insulated gate bipolar transistors (IGBTs) is protruded from an edge of the control circuit board; a plurality of bosses is protruded from an edge of the first mounting platform, and the plurality of IGBTs is respectively attached to the plurality of bosses for heat dissipation.

In a class of this embodiment, an electric reactor is disposed on the second mounting platform and is electrically connected to the power circuit board.

In a class of this embodiment, the electric reactor is disposed below the rectifier bridge module.

In a class of this embodiment, a mounting bracket is disposed on the second mounting platform, and the electric reactor is disposed on the second mounting platform; and the mounting bracket is fixed on the second mounting platform through bolts.

In a class of this embodiment, the second mounting platform comprises a wire outlet.

In a class of this embodiment, the side wall comprises an inner side wall and an outer side wall; a cavity is formed between the inner side wall and the outer side wall; the wire outlet communicates with the cavity and is vertical upwards; the power circuit board comprises a through hole; wire leads of the control circuit board pass through the through hole and lead out via the wire outlet to connect to a load.

In a class of this embodiment, the inner side wall is arc-shaped, and the outer side wall is circular.

In a class of this embodiment, the motor controller further comprises a cover plate covering an opening of the housing.

The disclosure further provides an outer rotor motor, comprising a motor body and the motor controller. The motor body comprises a rotating shaft, a stator assembly, an outer rotor and a sleeve base; the sleeve base comprises a base plate and a sleeve protruding upward from a middle of the base plate; both ends of the sleeve are provided with two bearing chambers, respectively; each bearing chamber comprises a bearing; the rotating shaft is disposed in the sleeve, and both ends of the rotating shaft are respectively supported by bearings in the two bearing chambers; the stator assembly is disposed around the sleeve; the outer rotor sleeves the stator assembly; a bottom surface of the bottom plate is provided with a plurality of first heat dissipation ribs distributed circumferentially around the rotating shaft; a first air duct is formed between every two adjacent first heat dissipation ribs, and inner ends of all first heat dissipation ribs form a first holding cavity; a fan is embedded in the first holding cavity, and one end of the rotating shaft extends out of the base plate and is connected to the fan in the first holding cavity; and the motor controller is disposed on the bottom surface of the bottom plate; and the housing comprises an end face attached to lower ends of the plurality of first heat dissipation ribs.

In a class of this embodiment, a plurality of second radiating ribs disposed on the end face and distributed circumferentially around the rotating shaft; a second air duct is formed between every two adjacent second radiating ribs, and inner ends of all second radiating ribs form a second holding cavity; when the motor controller is installed on the bottom surface of the base plate, a bottom of the fan partially extends into the second holding cavity.

The following advantages are associated with the motor controller of the disclosure. The motor controller comprises a housing, a power circuit board, and a control circuit board. The housing comprises a first mounting platform, a second mounting platform, and a side wall; there is a height difference between the first mounting platform and the second mounting platform; the first mounting platform is disposed on an upper part of the side wall, and the second mounting platform is disposed on a middle part of the side wall; the second mounting platform is disposed on one side of the first mounting platform; the first mounting platform and the side wall form an upper chamber, and the control circuit board and the power circuit board are disposed in the upper chamber; the control circuit board is closer to the first mounting platform than the power circuit board; the second mounting platform and the side wall form a lower chamber; the lower chamber communicates with the upper chamber; and a rectifier bridge module protrudes from the power circuit board, and is attached to the second mounting platform for heat dissipation. In this way, motors with different sizes, powers and volumes can adopt control boards, installation cavities and installation platforms with unified specifications, thus achieving the standardization and generalization of parts, which not only improves the design and production efficiency, but also reduces the cost and simplify the management, so as to ensure the good heat dissipation effect of high-power devices and meet the heat dissipation requirements of high-power motors.

DETAILED DESCRIPTION

Figure 1:
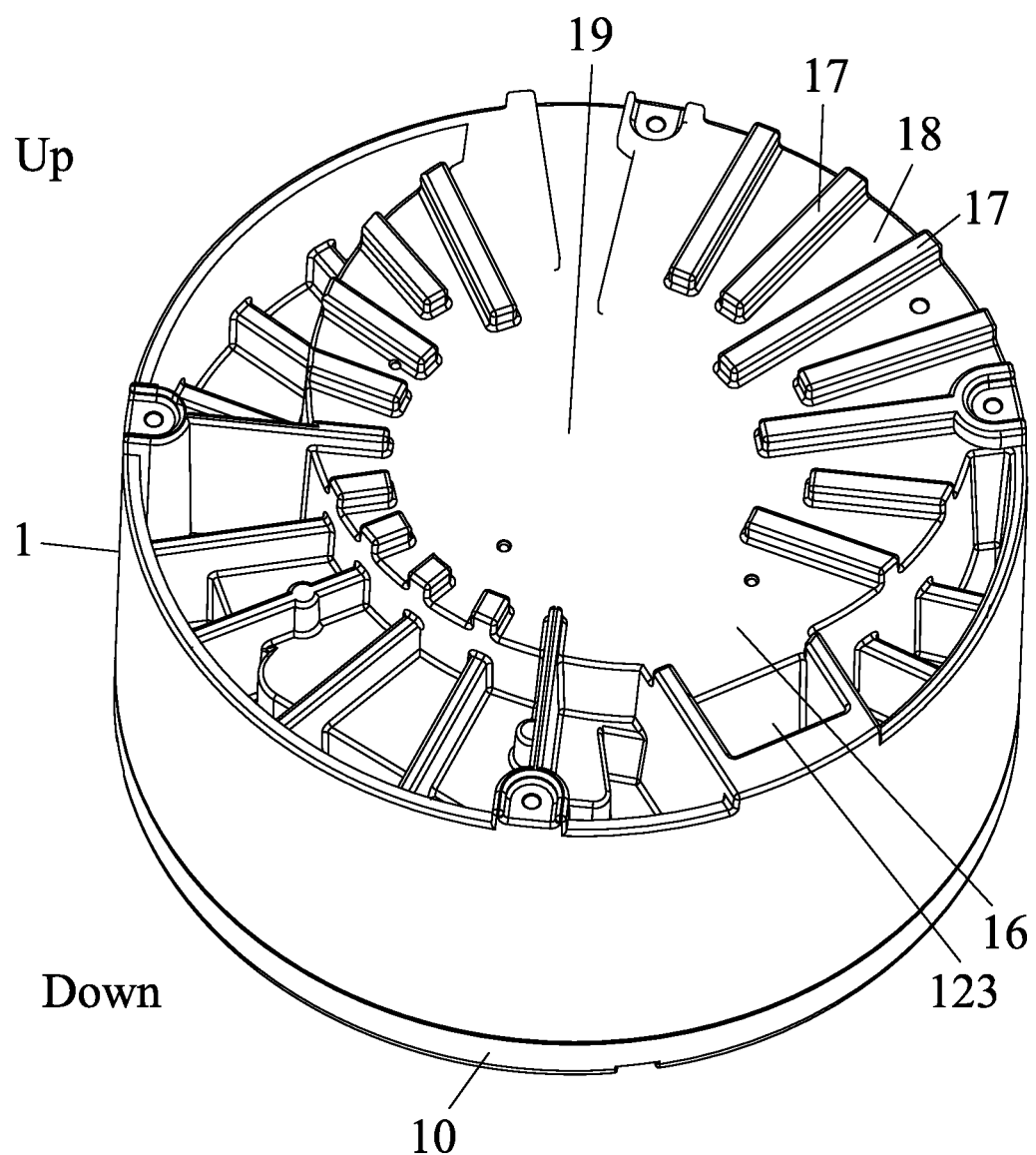
FIG. 1 is a schematic diagram of a motor controller in Example 1 of the disclosure.
Figure 2:
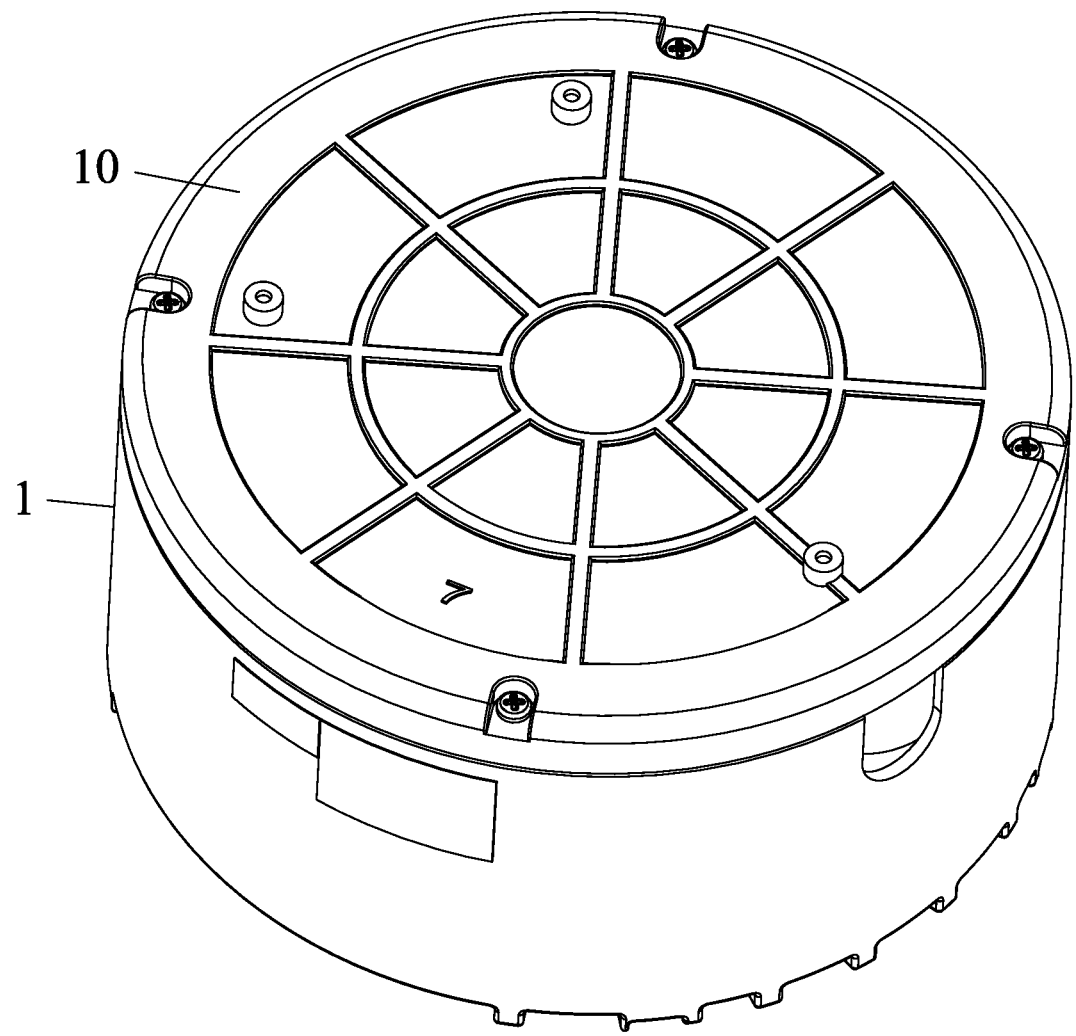
FIG. 2 is a schematic diagram of a motor controller in Example 1 of the disclosure in another angle of view.
Figure 3:
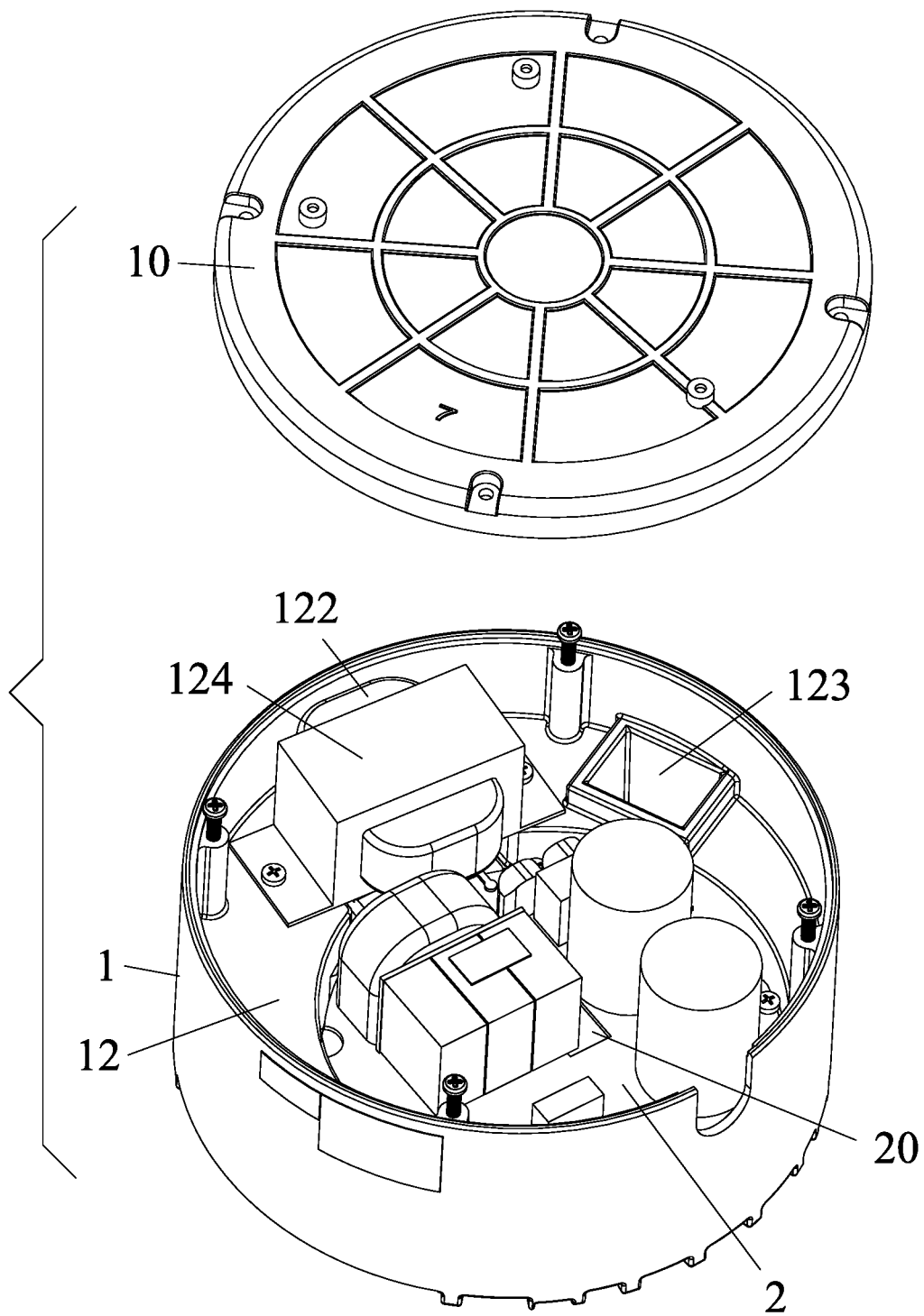
FIG. 3 is a first exploded view of a motor controller in Example 1 of the disclosure.
Figure 4:
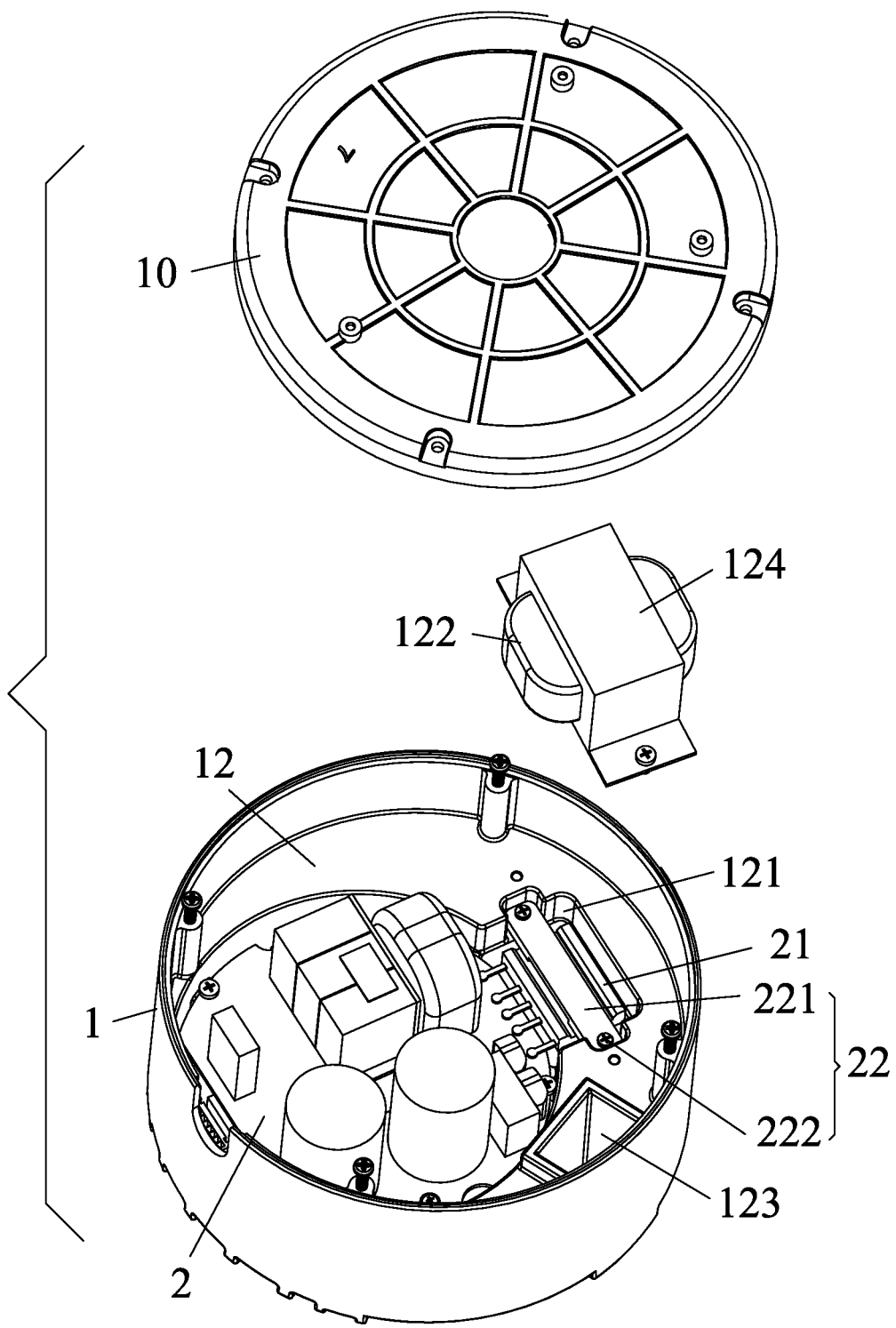
FIG. 4 is a second exploded view of a motor controller in Example 1 of the disclosure.
Figure 5:
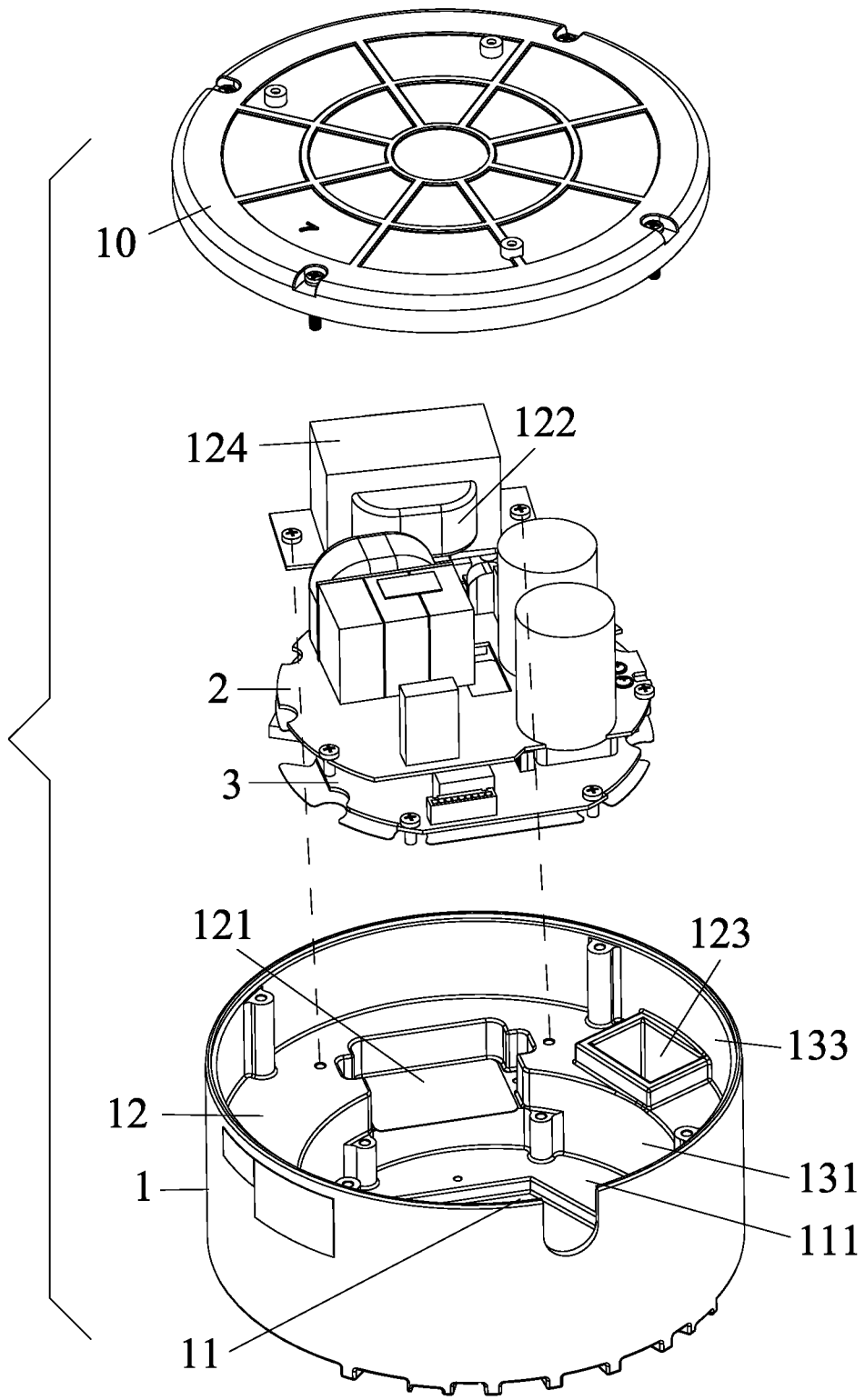
FIG. 5 is a third exploded view of a motor controller in Example 1 of the disclosure.
Figure 6:
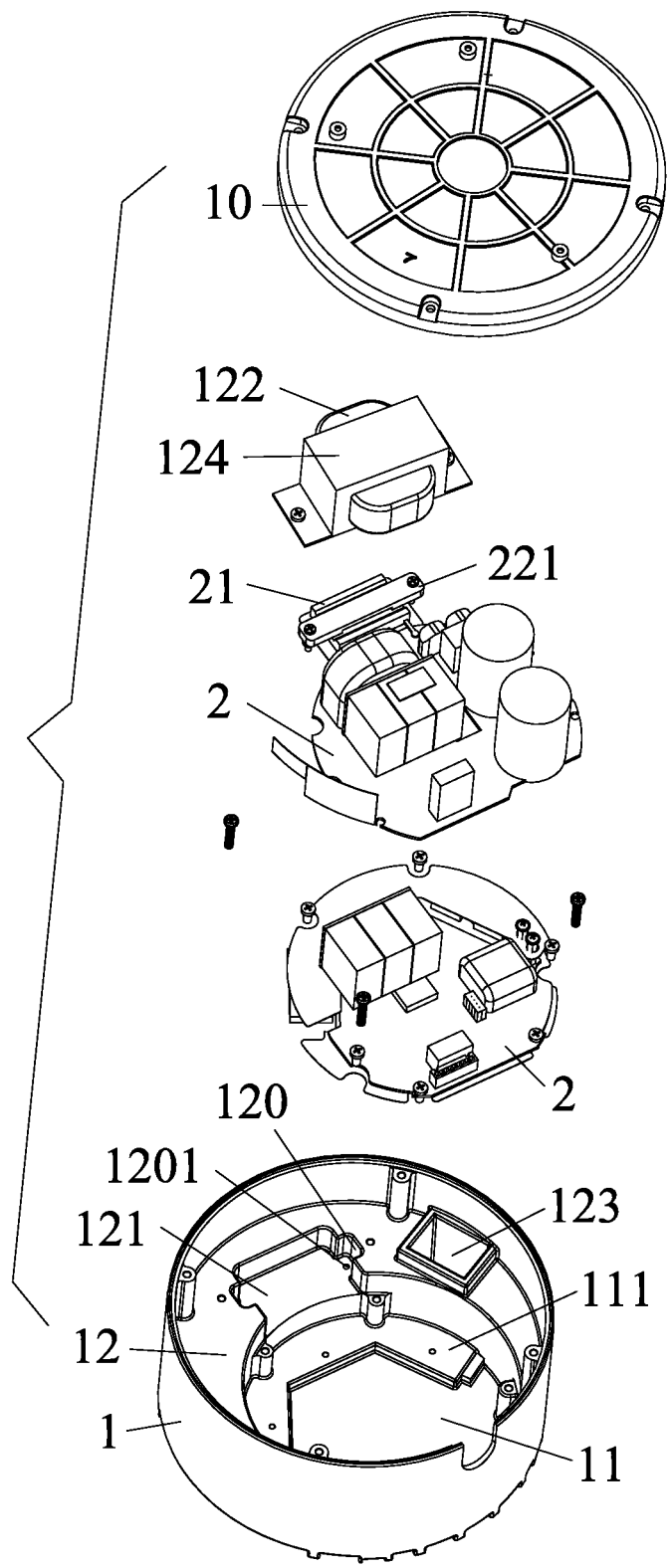
FIG. 6 is a fourth exploded view of a motor controller in Example 1 of the disclosure.
Figure 7:
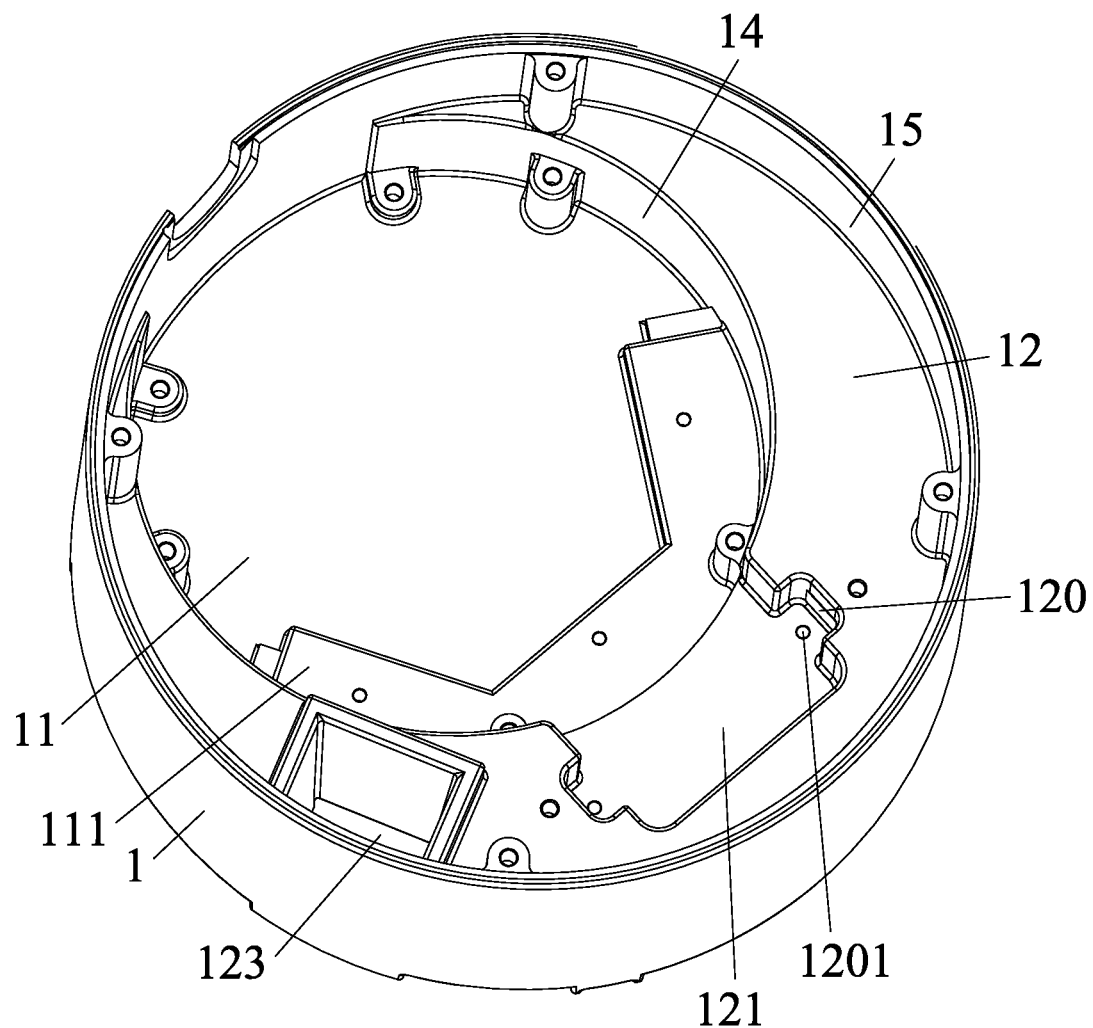
FIG. 7 is a schematic diagram of a housing of a motor controller in Example 1 of the disclosure.
Figure 8:
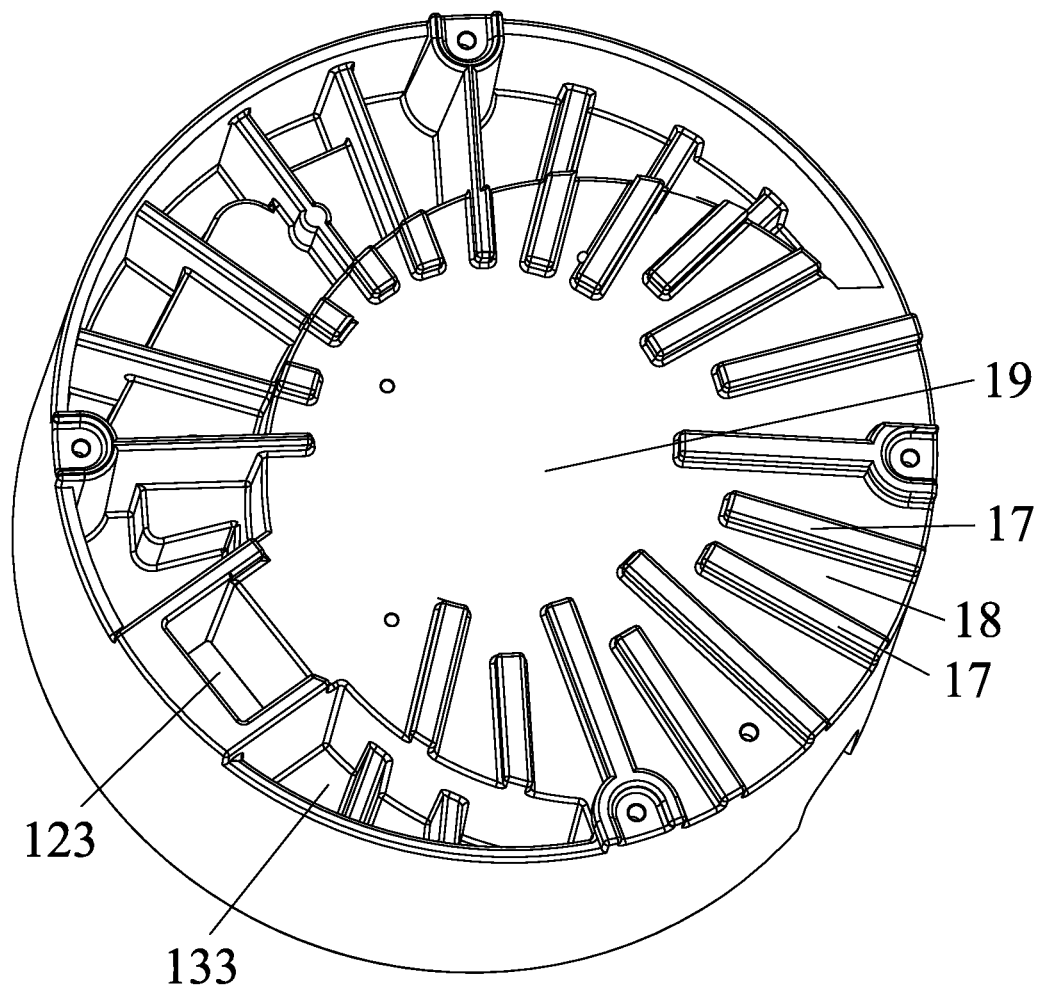
FIG. 8 is a schematic diagram of a housing of a motor controller in Example 1 of the disclosure in another angle of view.
Figure 9:
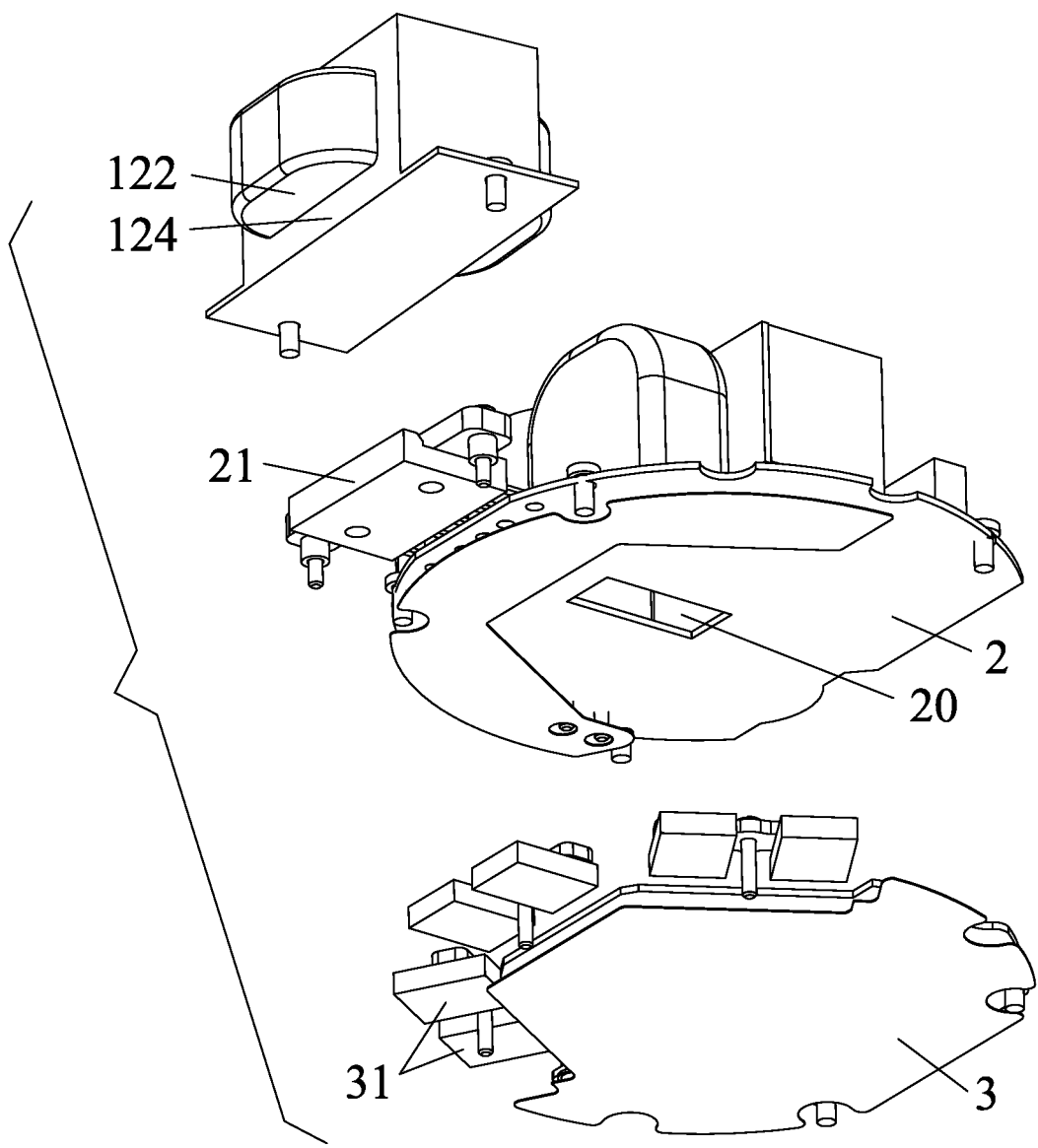
FIG. 9 is a first exploded view showing an inner structure of a motor controller in Example 1 of the disclosure.
Figure 10:
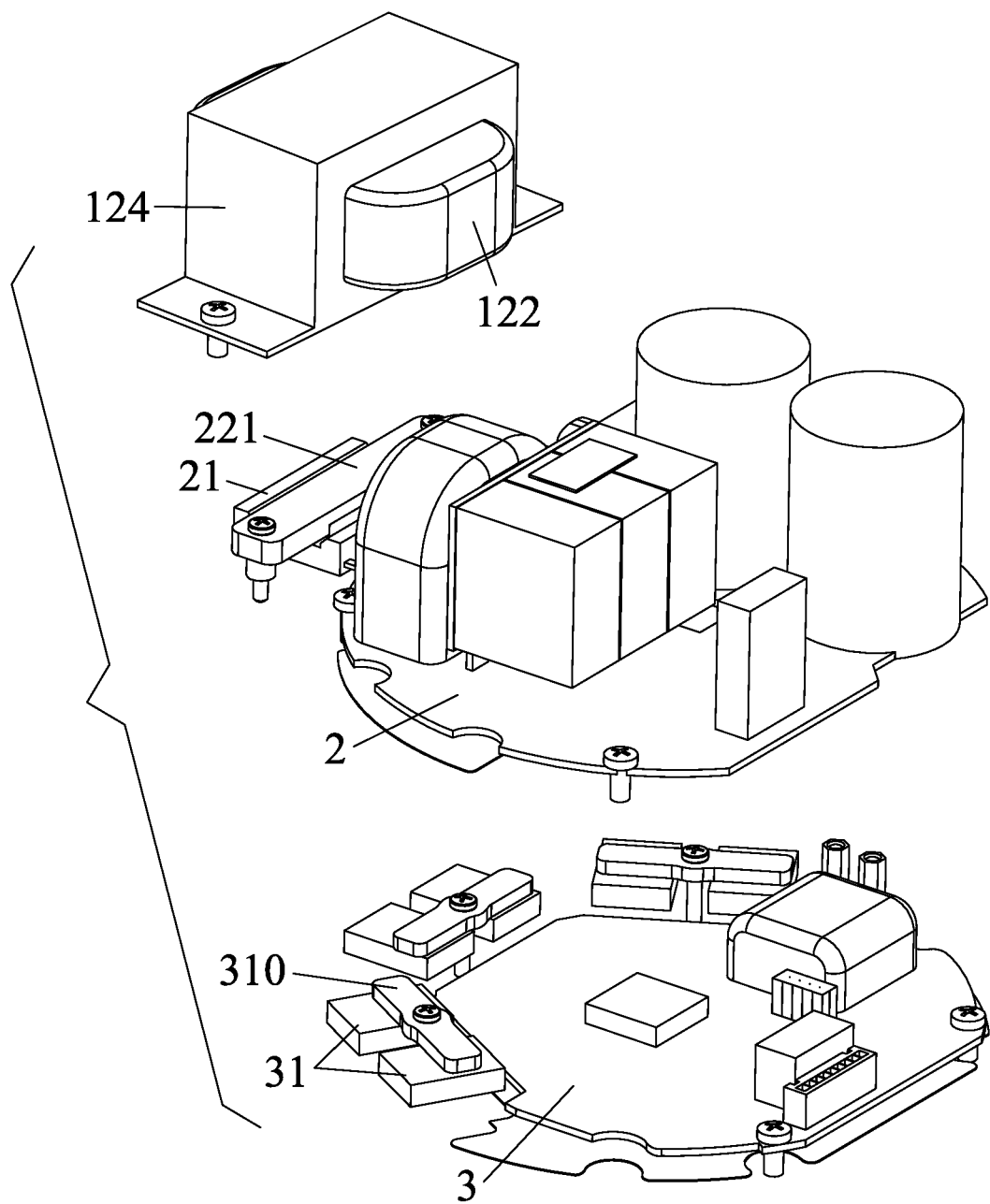
FIG. 10 is a second exploded view showing an inner structure of a motor controller in Example 1 of the disclosure.
Figure 11:
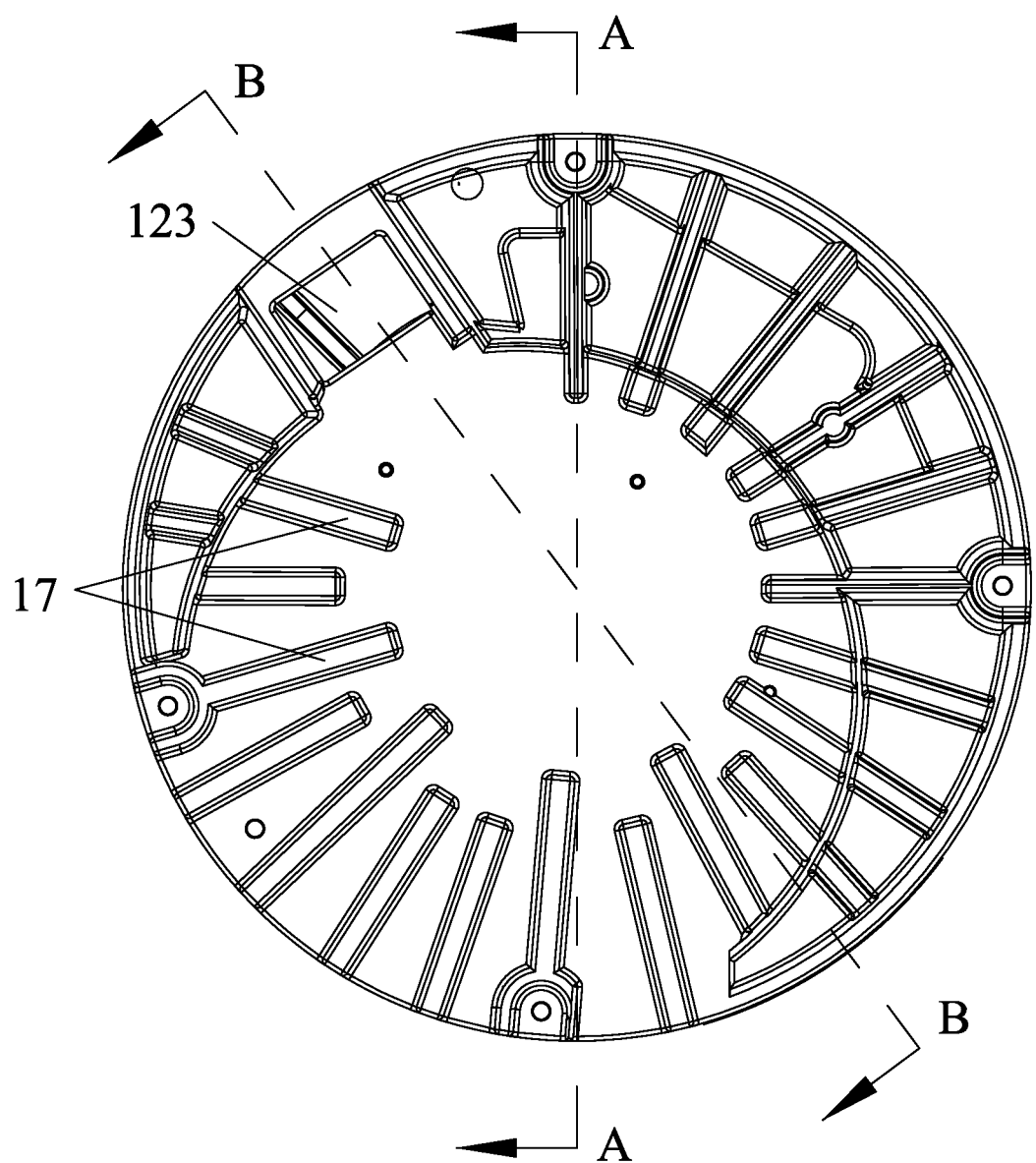
FIG. 11 is a top view of an inner structure of a motor controller in Example 1 of the disclosure.
Figure 12:
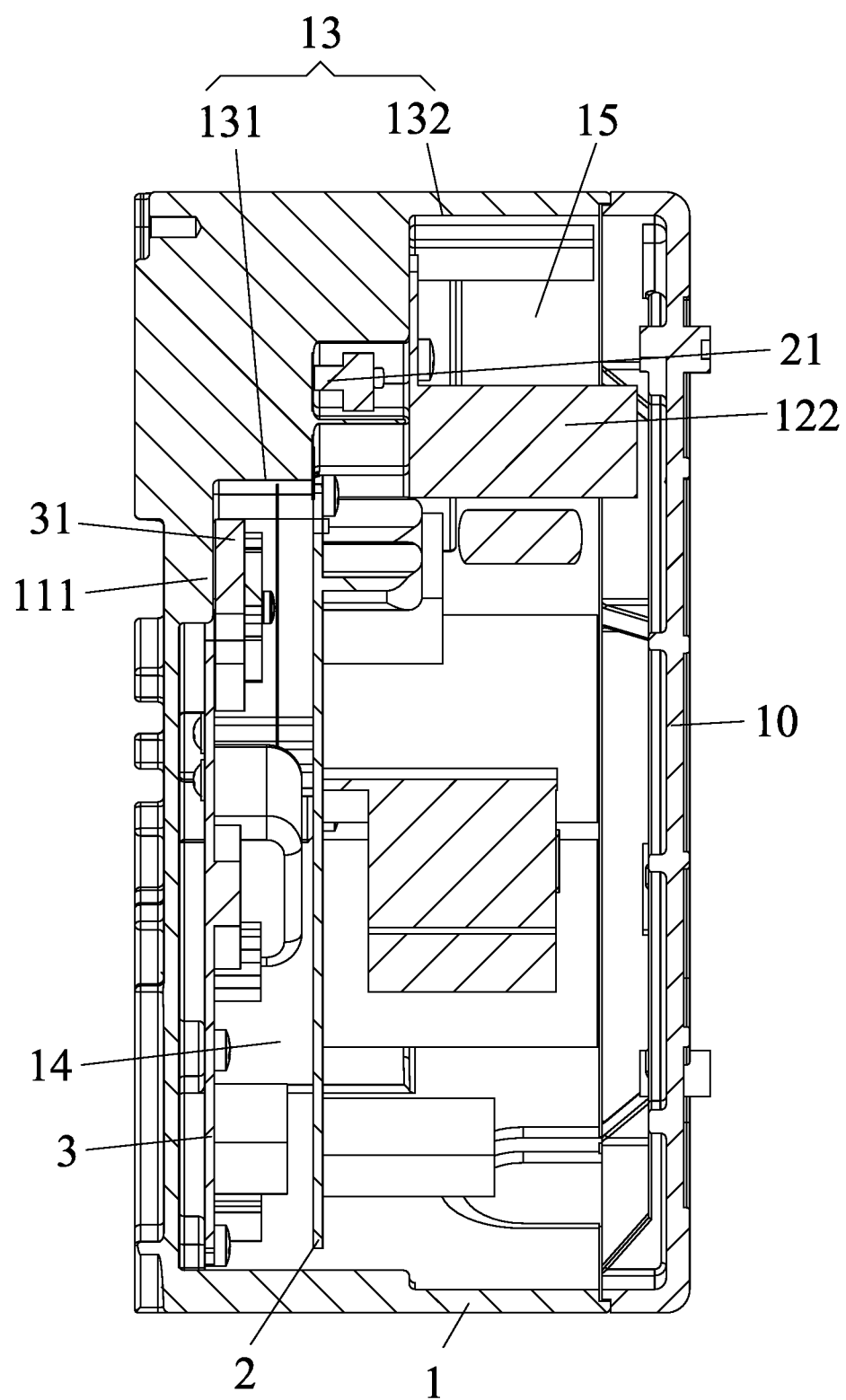
FIG. 12 is a sectional view taken from line A-A in FIG. 11.
Figure 13:
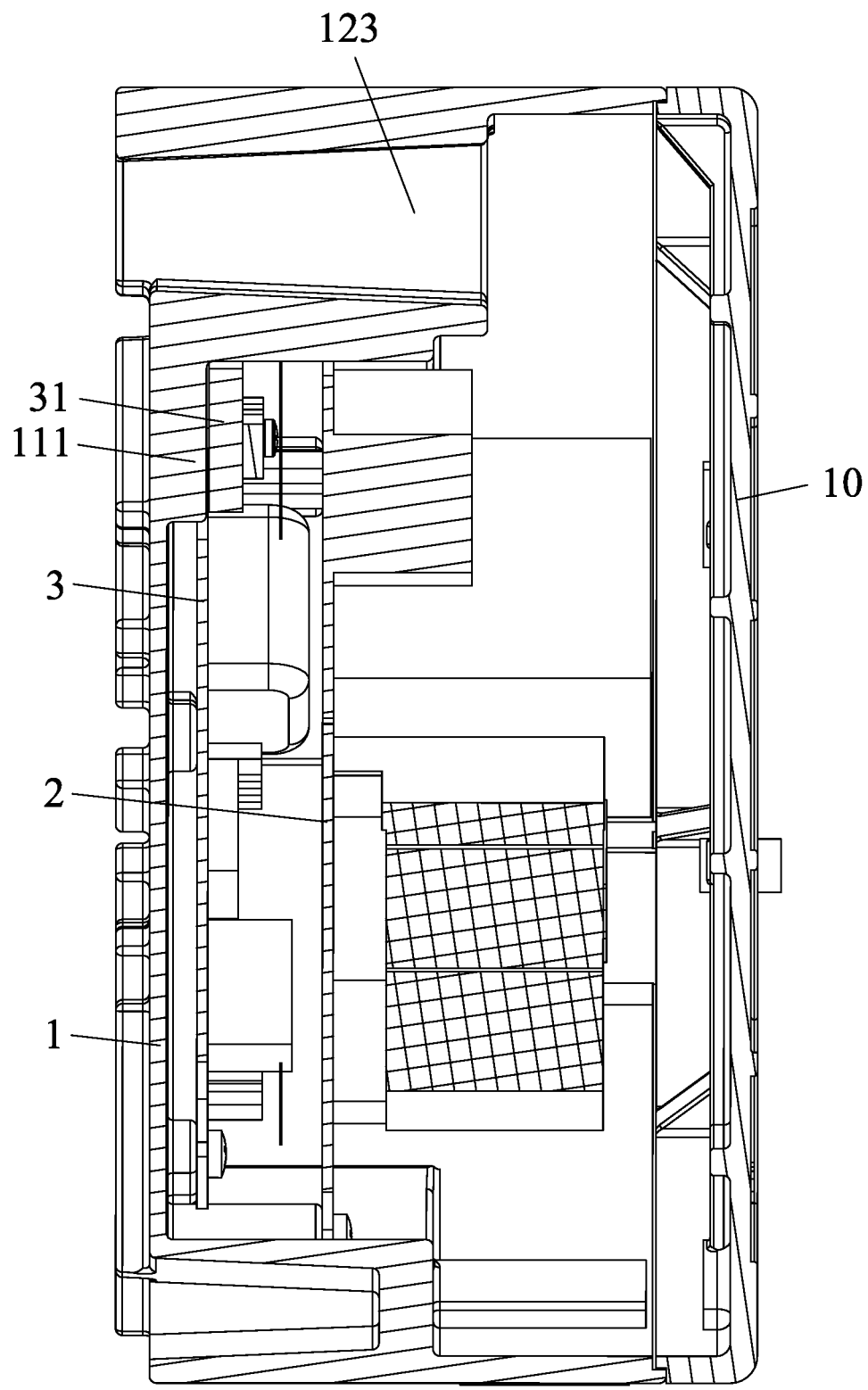
FIG. 13 is a sectional view taken from line B-B in FIG. 11.
Figure 14:
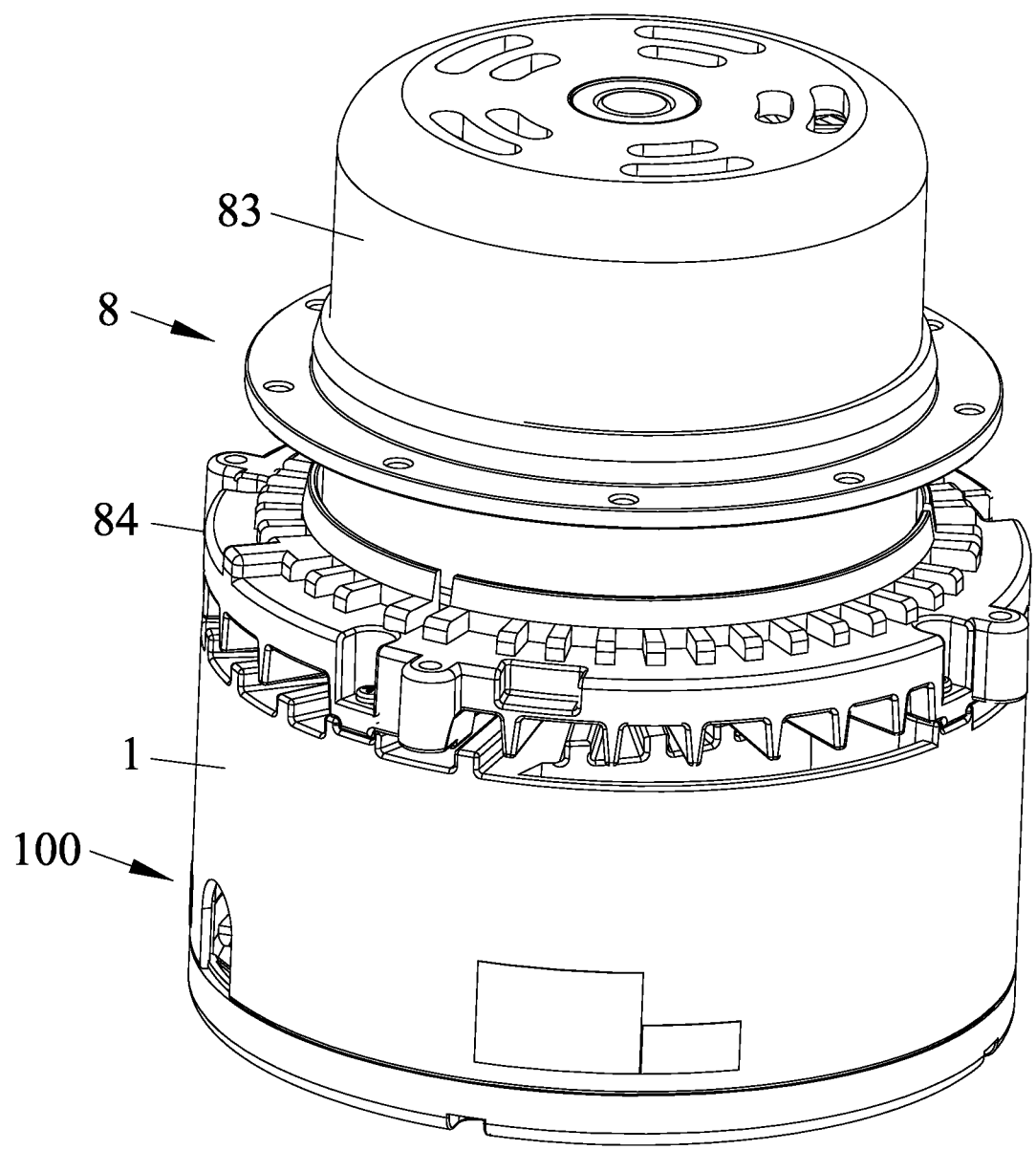
FIG. 14 is a schematic diagram of an outer rotor motor in Example 2 of the disclosure.
Figure 15:
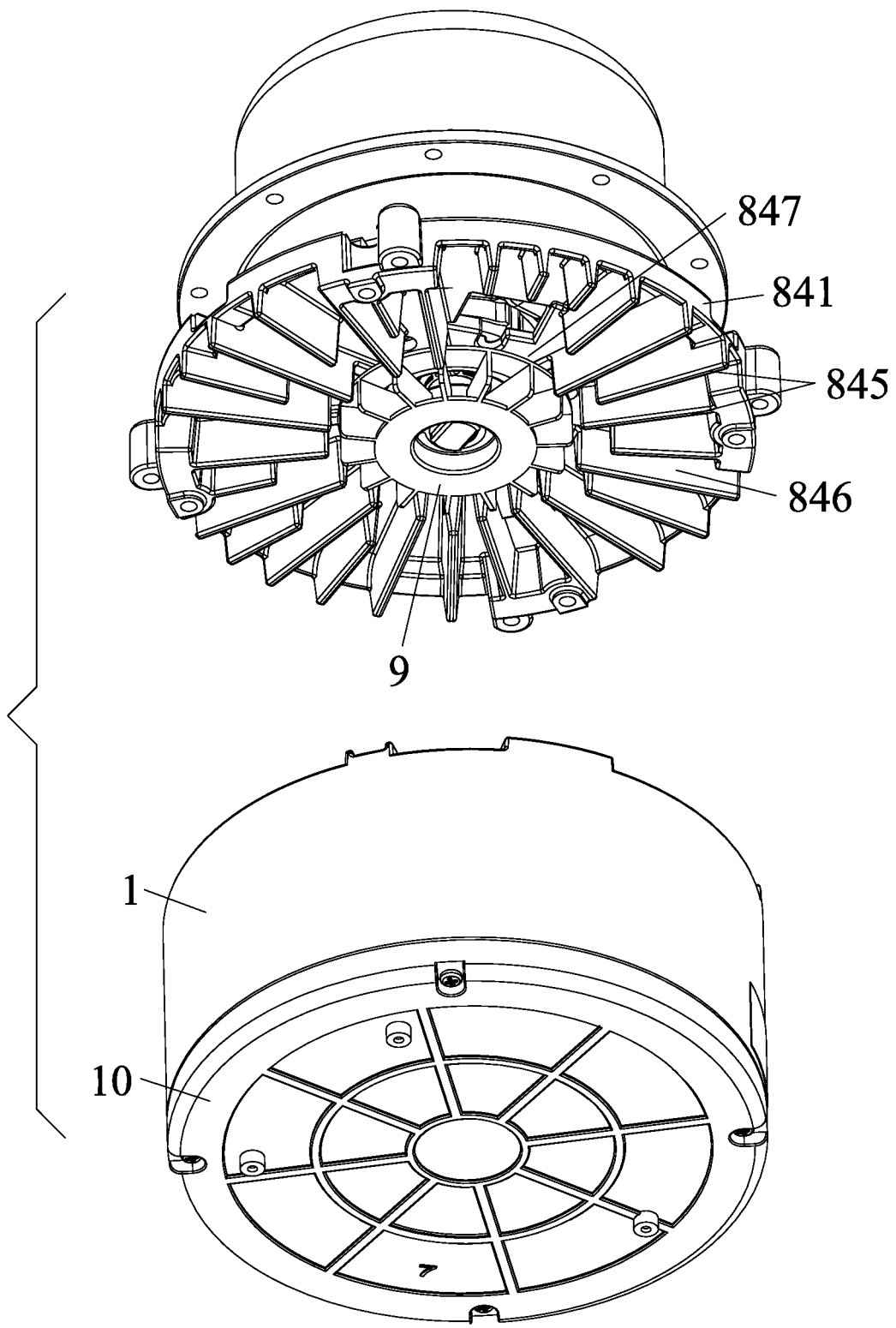
FIG. 15 is an exploded view of an outer rotor motor in Example 2 of the disclosure.
Figure 16:
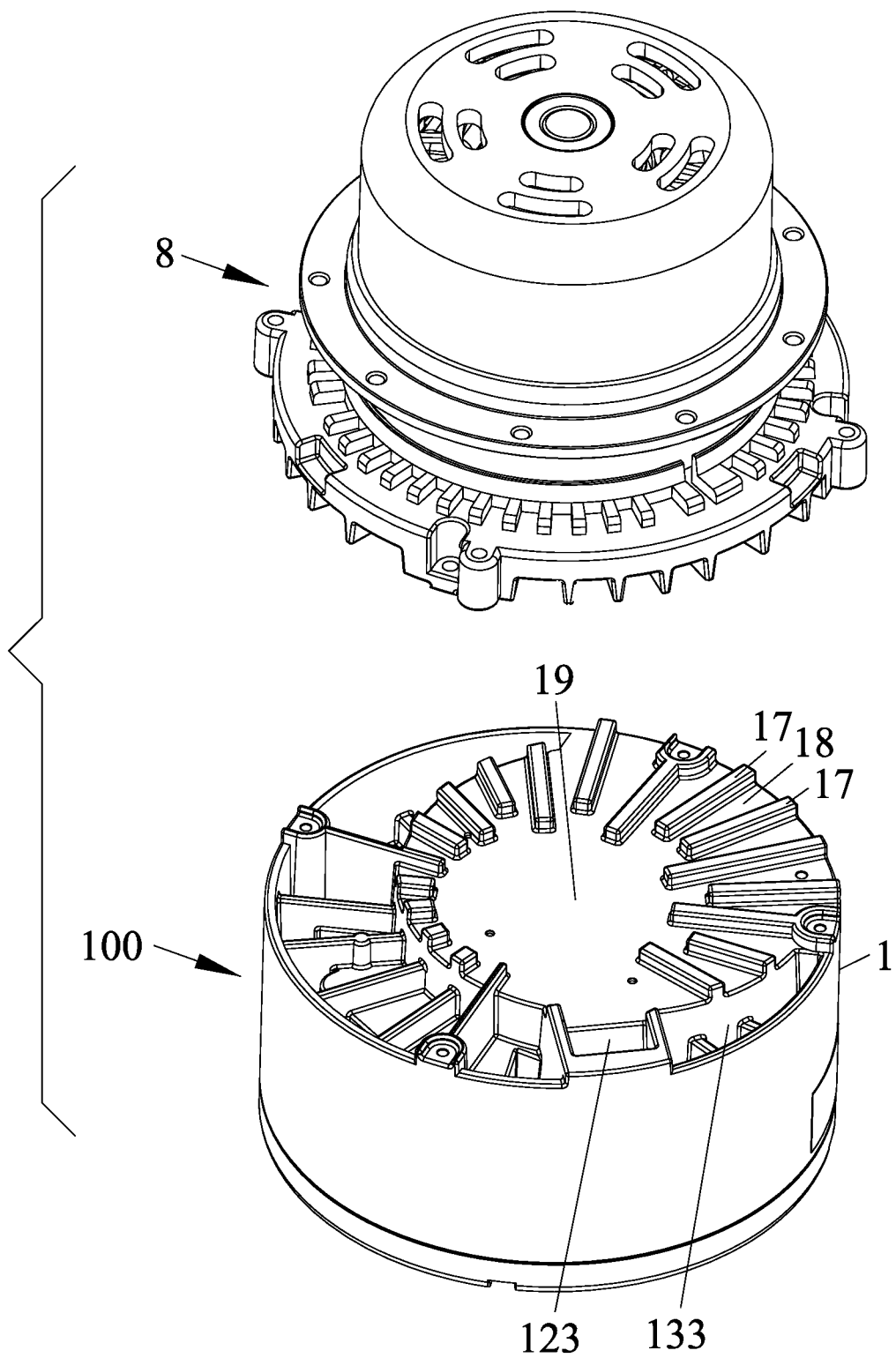
FIG. 16 is an exploded view of an outer rotor motor in Example 2 of the disclosure in another angle of view.
Figure 17:
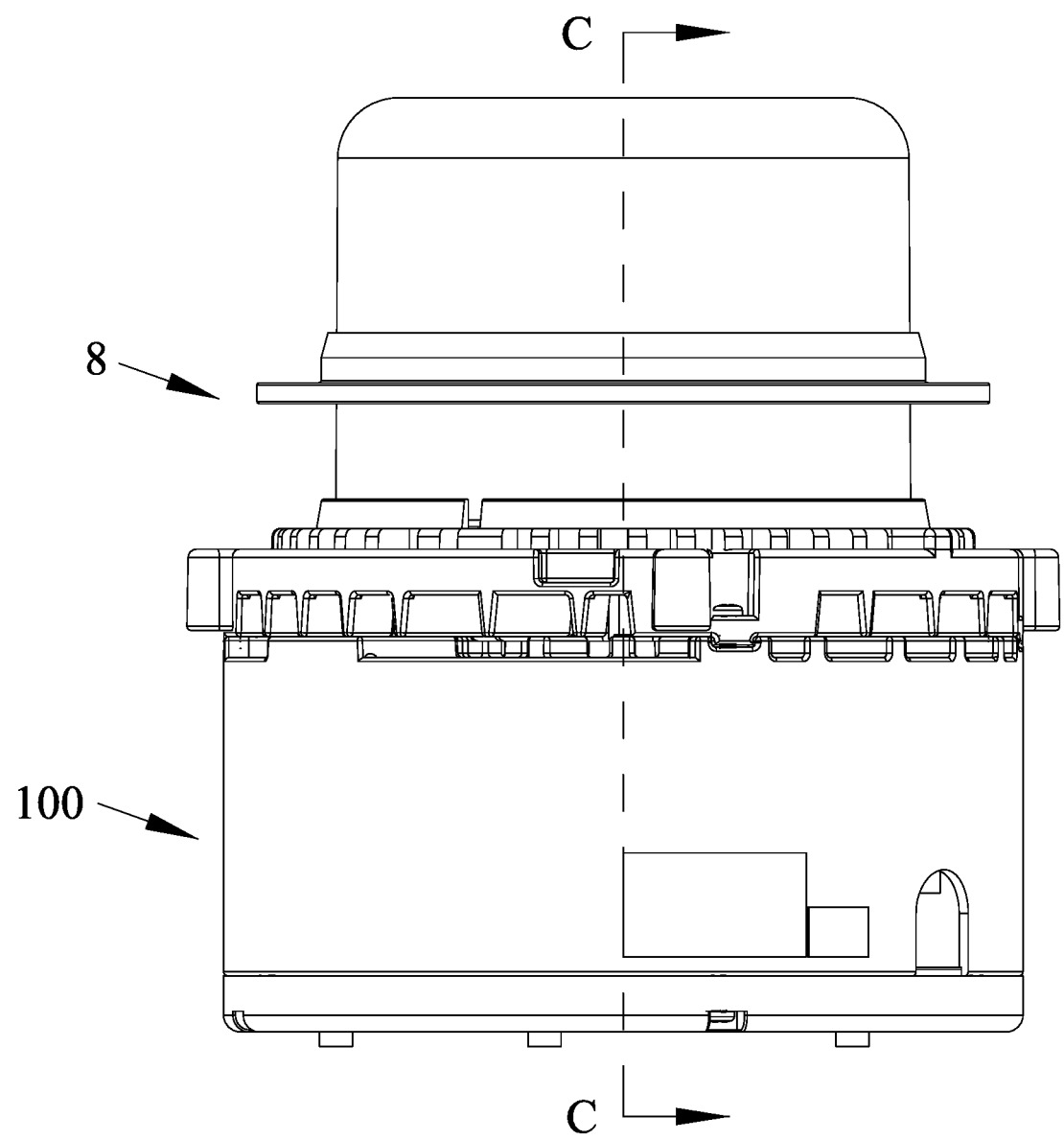
FIG. 17 is a front view of an outer rotor motor in Example 2 of the disclosure.
Figure 18:
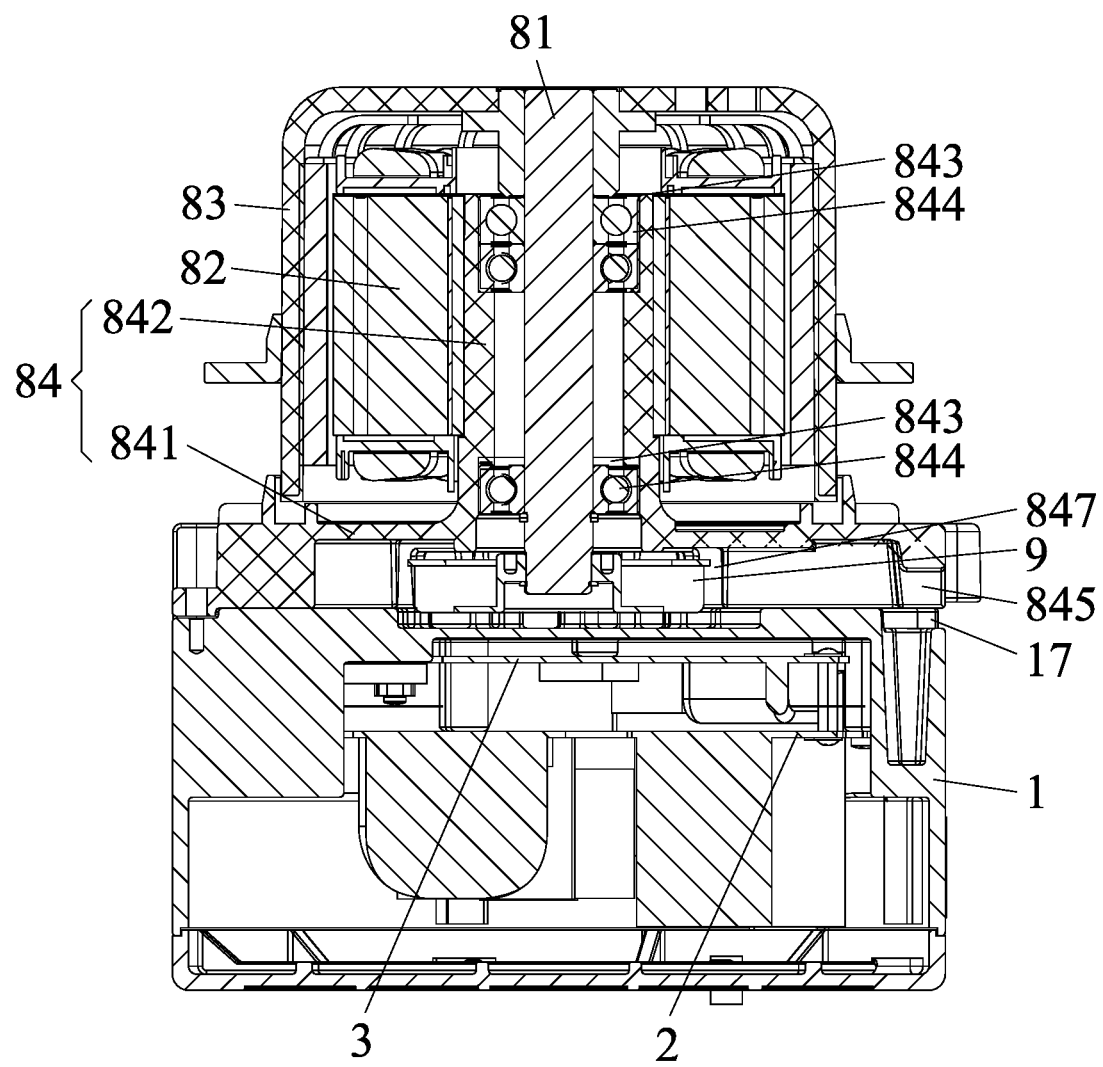
FIG. 18 is a sectional view taken from line B-B in FIG. 16.

To further illustrate, embodiments detailing a motor controller are described below. It should be noted that the following embodiments are intended to describe and not to limit the disclosure.

As shown in FIGS. 1-13, the disclosure provides a motor controller, comprising a housing 1, a power circuit board 2, and a control circuit board 3. The housing 1 comprises a first mounting platform 11, a second mounting platform 12, and a side wall 13; there is a height difference between the first mounting platform 11 and the second mounting platform 12; the first mounting platform 11 is disposed on an upper part of the side wall 13, and the second mounting platform 12 is disposed on a middle part of the side wall 13; the second mounting platform 12 is disposed on one side of the first mounting platform 11; the first mounting platform 11 and the side wall 13 form an upper chamber 14, and the control circuit board 3 and the power circuit board 2 are disposed in the upper chamber 14; the control circuit board 3 is closer to the first mounting platform 11 than the power circuit board 2; the second mounting platform 12 and the side wall 13 form a lower chamber 15; the lower chamber 15 communicates with the upper chamber 14; and a rectifier bridge module 21 protrudes from the power circuit board 2, and is attached to the second mounting platform 12 for heat dissipation. In this way, motors with different sizes, powers and volumes can adopt control boards, installation cavities and installation platforms with unified specifications, thus achieving the standardization and generalization of parts, which not only improves the design and production efficiency, but also reduces the cost and simplify the management, so as to ensure the good heat dissipation effect of high-power devices and meet the heat dissipation requirements of high-power motors.

The second mounting platform 12 comprises a recess 121; the rectifier bridge module 21 is embedded in the recess 121 for heat dissipation, and is locked on the second mounting platform 12 through a locking device 22. Thus, the rectifier bridge module 21 has good heat dissipation effect.

The locking device 22 comprises a first depression bar 221 and at least two bolts 222; two ends of the recess 121 are concave to form two gaps 120, respectively; a bottom surface of the recess in the two gaps comprises two mounting holes 1201; two ends of the first depression bar 221 are disposed in the two gaps 120, respectively, whereby the first depression bar 221 presses on the rectifier bridge module 21; and the at least two bolts 222 pass through the first depression bar 221 and fixedly screwed in the two mounting holes 1201 on the bottom surface of the recess.

A plurality of insulated gate bipolar transistors (IGBTs) is protruded from an edge of the control circuit board 3; a plurality of bosses 111 is protruded from an edge of the first mounting platform 11, and the plurality of IGBTs is respectively attached to the plurality of bosses 111 for heat dissipation. A second depression bar 310 is disposed on the bottom of each IGBT 31. The second depression bar 310 fixes the IGBT 31 on the boss through bolts, thus ensuring the heat dissipation effect of the IGBTs 31.

An electric reactor 122 is disposed on the second mounting platform 12 and is electrically connected to the power circuit board 2. The layout is reasonable, which can effectively prevent the heat of the electric reactor from radiating to other components, and the heat dissipation effect is good.

The electric reactor 122 is disposed below the rectifier bridge module 21. The layout is reasonable, improving the space utilization.

A mounting bracket 124 is disposed on the second mounting platform 12, and the electric reactor 122 is disposed on the second mounting platform 12; and the mounting bracket 124 is fixed on the second mounting platform 12 through bolts.

The second mounting platform 12 comprises a wire outlet 123, which is easy to guide the lead out of the motor controller, and the structural layout is reasonable.

The side wall 13 comprises an inner side wall 131 and an outer side wall 132; a cavity 133 is formed between the inner side wall 131 and the outer side wall 132; the wire outlet 123 communicates with the cavity 133 and is vertical upwards; the power circuit board 2 comprises a through hole 20; wire leads of the control circuit board 3 pass through the through hole 20 and lead out via the wire outlet 123 to connect to a load.

The inner side wall 131 is arc-shaped, and the outer side wall 312 is circular.

The motor controller further comprises a cover plate 10 covering an opening of the housing 1.

Figure 19:
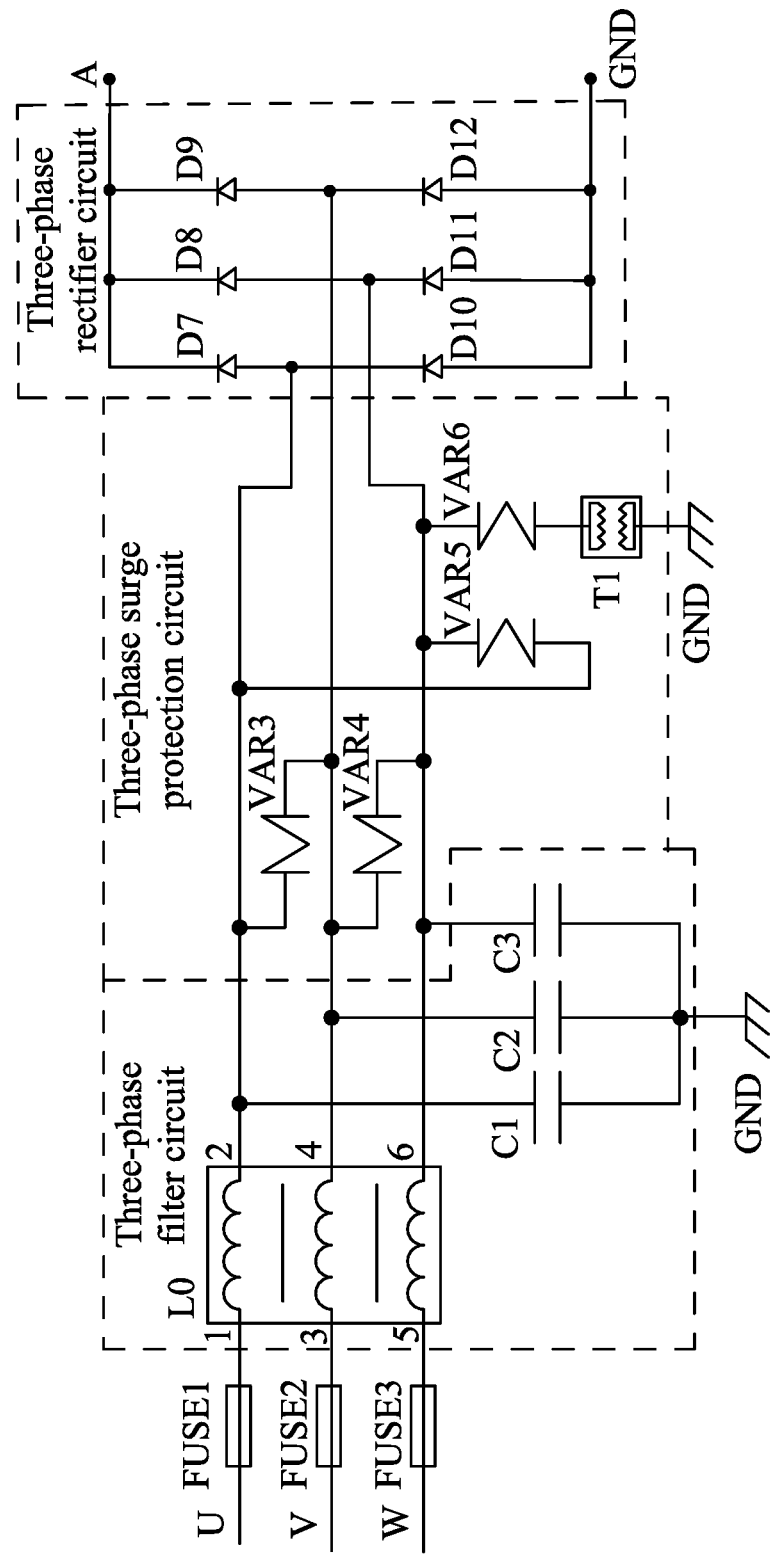
FIG. 19 is a circuit diagram of a power circuit board of the disclosure.
Figure 20:
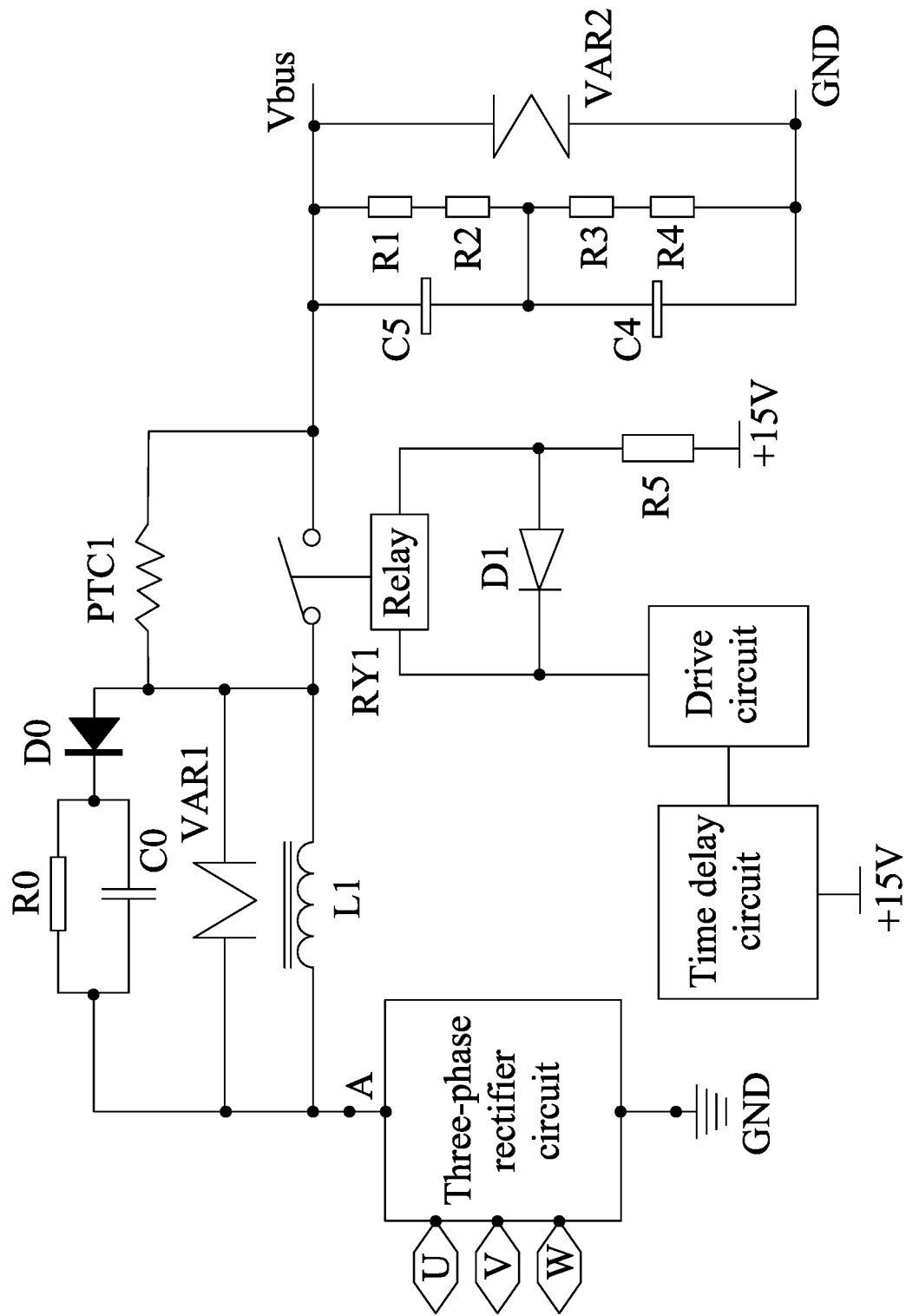
FIG. 20 is a circuit diagram of the disclosure.
Figure 21:
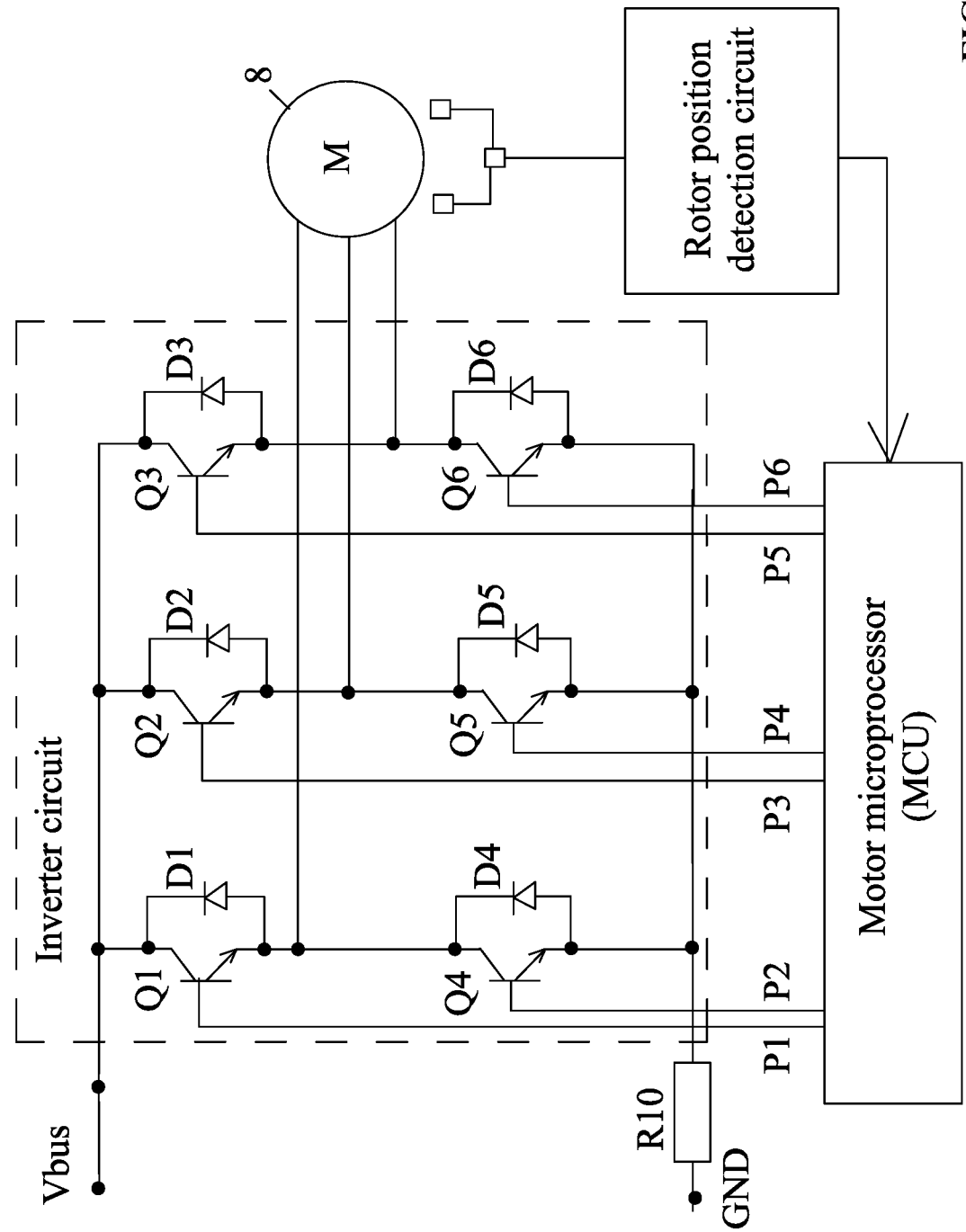
FIG. 21 is a circuit diagram of a control circuit board of the disclosure.

As shown in FIGS. 19, 20 and 21, the power circuit board 2 comprises a three-phase filter circuit, a three-phase surge protection circuit and a three-phase rectifier circuit. One end of the three-phase rectifier circuit is connected to the input end of the electric reactor L1, and the output end of the three-phase rectifier circuit charges an electrolytic capacitor after adjusting the power factor through the electric reactor L1 to form a DC bus voltage VBUS output.

The control circuit board 3 comprises a microprocessor MCU, an inverter circuit and a motor operation parameter detection circuit (i.e. position detection circuit). The motor operation parameter detection circuit transmits the real-time operation parameters of the motor to the microprocessor MCU. The microprocessor MCU controls the operation of the inverter circuit, and the output end of the inverter circuit is connected to the motor.

Example 2

As shown in FIGS. 1, 8, 14 and 18, an outer rotor motor comprises a motor body 8 and the motor controller 100 in Example 1.

The motor body 8 comprises a rotating shaft 81, a stator assembly 82, an outer rotor 83 and a sleeve base 84; the sleeve base 84 comprises a base plate 841 and a sleeve 842 protruding upward from a middle of the base plate 841; both ends of the sleeve 842 are provided with two bearing chambers 843, respectively; each bearing chamber 843 comprises a bearing 844; the rotating shaft 81 is disposed in the sleeve 842, and both ends of the rotating shaft are respectively supported by bearings 844 in the two bearing chambers 843; the stator assembly 82 is disposed around the sleeve 842; the outer rotor 83 sleeves the stator assembly 82; a bottom surface of the bottom plate 841 is provided with a plurality of first heat dissipation ribs 845 distributed circumferentially around the rotating shaft; a first air duct 846 is formed between every two adjacent first heat dissipation ribs 845, and inner ends of all first heat dissipation ribs 845 form a first holding cavity 847; a fan 9 is embedded in the first holding cavity 847, and one end of the rotating shaft 81 extends out of the base plate 841 and is connected to the fan 9 in the first holding cavity 847.

The motor controller is disposed on the bottom surface of the bottom plate 841; and the housing 1 comprises an end face attached to lower ends of the plurality of first heat dissipation ribs 845. When the motor is running, the rotating shaft drives the fan 9 to rotate, and the fan 9 pushes the heat of the motor 8 and the motor controller 100 to discharge from the first air duct 846 thus releasing the heat of the motor and the motor controller, so as to ensure good heat dissipation effect of high-power devices and meet the heat dissipation requirements of high-power motors.

A plurality of second radiating ribs 17 disposed on the end face 16 and distributed circumferentially around the rotating shaft; a second air duct 18 is formed between every two adjacent second radiating ribs 17, and inner ends of all second radiating ribs 17 form a second holding cavity 19; when the motor controller 100 is installed on the bottom surface of the base plate 841, a bottom of the fan 9 partially extends into the second holding cavity 19, thus improving the heat dissipation effect of motor controller 100 and ensuring good heat dissipation effect of high-power devices.

It will be obvious to those skilled in the art that changes and modifications may be made, and therefore, the aim in the appended claims is to cover all such changes and modifications.

What is claimed is:

1. The motor controller of A motor controller, comprising:
    a housing;
    a power circuit board; and
    a control circuit board;
wherein:
    the housing comprises a first mounting platform, a second mounting platform, and a side wall; there is a height difference between the first mounting platform and the second mounting platform;
    the first mounting platform is disposed on an upper part of the side wall, and the second mounting platform is disposed on a middle part of the side wall;
    the second mounting platform is disposed on one side of the first mounting platform;
    the first mounting platform and the side wall form an upper chamber, and the control circuit board and the power circuit board are disposed in the upper chamber; the control circuit board is closer to the first mounting platform than the power circuit board;
    the second mounting platform and the side wall form a lower chamber; the lower chamber communicates with the upper chamber;
    a rectifier bridge module protrudes from the power circuit board, and is attached to the second mounting platform for heat dissipation;
    the second mounting platform comprises a recess; the rectifier bridge module is embedded in the recess for heat dissipation, and is locked on the second mounting platform through a locking device;
    the locking device comprises a depression bar and at least two bolts; two ends of the recess are concave to form two gaps, respectively; a bottom surface of the recess in the two gaps comprises two mounting holes; two ends of the depression bar are disposed in the two gaps, respectively, whereby the depression bar presses on the rectifier bridge module; and the at least two bolts pass through the depression bar and fixedly screwed in the two mounting holes on the bottom surface of the recess;
    a plurality of insulated gate bipolar transistors (IGBTs) is protruded from an edge of the control circuit board; a plurality of bosses is protruded from an edge of the first mounting platform, and the plurality of IGBTs is respectively attached to the plurality of bosses for heat dissipation; and an electric reactor is disposed on the second mounting platform and is electrically connected to the power circuit board.

2. The motor controller of claim 1, wherein the electric reactor is disposed below the rectifier bridge module.

3. The motor controller of claim 2, wherein a mounting bracket is disposed on the second mounting platform, and the electric reactor is disposed on the second mounting platform; and the mounting bracket is fixed on the second mounting platform through bolts.

4. The motor controller of claim 3, wherein the second mounting platform comprises a wire outlet.

5. The motor controller of claim 4, wherein the side wall comprises an inner side wall and an outer side wall; a cavity is formed between the inner side wall and the outer side wall; the wire outlet communicates with the cavity and is vertical upwards; the power circuit board comprises a through hole; wire leads of the control circuit board pass through the through hole and lead out via the wire outlet to connect to a load.

6. The motor controller of claim 5, wherein the inner side wall is arc-shaped, and the outer side wall is circular.

7. The motor controller of claim 6, further comprising a cover plate covering an opening of the housing.

8. An outer rotor motor, comprising a motor body and the motor controller of claim 1, wherein:
the motor body comprises a rotating shaft, a stator assembly, an outer rotor and a sleeve base; the sleeve base comprises a base plate and a sleeve protruding upward from a middle of the base plate; both ends of the sleeve are provided with two bearing chambers, respectively; each bearing chamber comprises a bearing;
the rotating shaft is disposed in the sleeve, and both ends of the rotating shaft are respectively supported by bearings in the two bearing chambers;
the stator assembly is disposed around the sleeve; the outer rotor sleeves the stator assembly; a bottom surface of the bottom plate is provided with a plurality of first heat dissipation ribs distributed circumferentially around the rotating shaft; a first air duct is formed between every two adjacent first heat dissipation ribs, and inner ends of all first heat dissipation ribs form a first holding cavity; a fan is embedded in the first holding cavity, and one end of the rotating shaft extends out of the base plate and is connected to the fan in the first holding cavity; and
the motor controller is disposed on the bottom surface of the bottom plate; and the housing comprises an end face attached to lower ends of the plurality of first heat dissipation ribs.

9. The outer rotor motor of claim 8, wherein a plurality of second radiating ribs disposed on the end face and distributed circumferentially around the rotating shaft; a second air duct is formed between every two adjacent second radiating ribs, and inner ends of all second radiating ribs form a second holding cavity; when the motor controller is installed on the bottom surface of the base plate, a bottom of the fan partially extends into the second holding cavity.

* * * * *